United States Patent [19]

Miller

[11] 4,189,122

[45] Feb. 19, 1980

[54] WIDE ANGLE GIMBAL SYSTEM

[75] Inventor: Samuel A. Miller, Ridgecrest, Calif.

[73] Assignee: The United States of America as represented by the Secretary of the Navy, Washington, D.C.

[21] Appl. No.: 926,700

[22] Filed: Jul. 21, 1978

[51] Int. Cl.² .............................................. F16M 11/00
[52] U.S. Cl. ....................................... 248/176; 33/324; 73/178 R
[58] Field of Search ............. 248/176, 182; 73/178 R; 308/10; 74/86; 33/324, 325

[56] References Cited

U.S. PATENT DOCUMENTS

| 2,462,925 | 3/1949 | Varian | 73/178 R X |
|---|---|---|---|
| 2,640,159 | 5/1953 | Gerneth | 74/86 X |
| 3,108,185 | 10/1963 | Buerger | 74/86 X |
| 3,261,209 | 7/1966 | Rae | 73/178 R |
| 3,442,140 | 5/1969 | Pelteson | 73/178 R X |
| 3,483,746 | 12/1969 | Bers | 73/178 R |
| 3,691,987 | 9/1972 | Strock | 73/178 R X |
| 3,699,657 | 10/1972 | Kawada | 33/324 |
| 3,890,718 | 6/1975 | Gregerson et al. | 33/324 X |
| 4,087,919 | 5/1978 | Huvers | 33/324 X |
| 4,094,200 | 6/1978 | Chombard | 73/178 R X |

Primary Examiner—J. Franklin Foss
Attorney, Agent, or Firm—R. S. Sciascia; W. Thom Skeer; John Lynn

[57] ABSTRACT

A system for mounting a gimbal assembly to expand the range of angular motion of the gimbals and to permit direct connections to the gimbals. Two counter rotating members between the mounting base and the gimbal assembly change the spatial orientation of the plane on which the gimbal assembly is mounted without rotating the plane.

6 Claims, 2 Drawing Figures

WIDE ANGLE GIMBAL SYSTEM

BACKGROUND OF THE INVENTION

1. Field of the Invention

This invention relates generally to article support heads. In particular, this invention relates to gimbal systems. More particularly, this invention relates to gimbal systems for guidance of missiles and aircraft.

2. Description of the Prior Art

Inertial guidance systems use gimbals to allow a platform to have a constant orientation relative to an inertial reference frame. The conventional two axis gimbal system has a mounting base, an outer gimbal connected to the mounting base via a bearing or pivot, and an inner gimbal similarly connected to the outer gimbal so that the gimbal axes are perpendicular. The inner gimbal can remain aligned with an inertial frame while the mounting base moves about the gimbal axes. Limitations in the conventional system frequently arise when the configuration of the device which is mounted on the stable platform provided by the inner gimbal restricts the angular motion of the gimbals. Angular deviations from a given line are typically limited to 30 to 50 degrees in conventional systems.

SUMMARY OF THE INVENTION

The invention employs two rotary members between a two axis gimbal assembly and a mounting base. One rotary member has one end connected to the base, and has the plane of the other end at an angle to the plane of the base. The second rotary member is mounted on the first rotary member and a system of gears causes the second rotary member to counter-rotate relative to the first rotary member. Rotation of the first rotary member relative to the base causes the axis of the second rotary member to describe a cone about the axis of the first rotary member. Counter-rotation of the second rotary member causes the surface on which the gimbal assembly is mounted to change its spatial orientation without rotating relative to the base, thereby allowing an expanded range of angular motion of the gimbals relative to the base and permitting direct electrical and mechanical connections to the gimbals without the use of slip rings.

DETAILED DESCRIPTION OF THE PREFERRED EMBODIMENT

Figure 1:
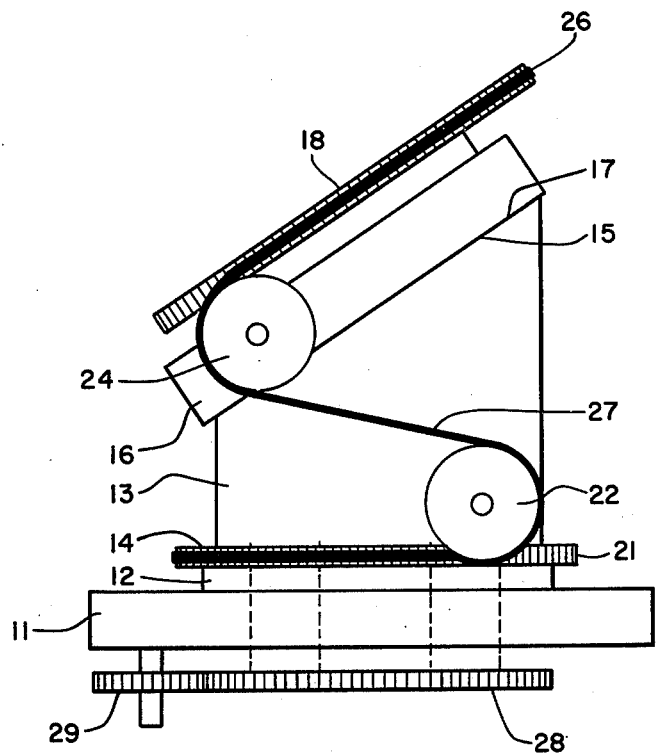
FIG. 1 is a front elevation view of the invention.

Referring to FIG. 1, the wide angle gimbal system comprises a mounting base 11, which is conveniently fixed to the airframe of an aircraft or missile and formed from a suitable material. A central support member 12 extends from base 11.

A first rotary member 13 has a planar surface 14 rotatably mounted on central support member 12. Rotary member 13 has a second planar surface 15 which is at an angle, hereinafter called the cant angle, to planar surface 14. In the illustrated embodiment the cant angle is 40°. A second rotary member 16 has a planar surface 17 rotatably connected to planar surface 15.

Figure 2:
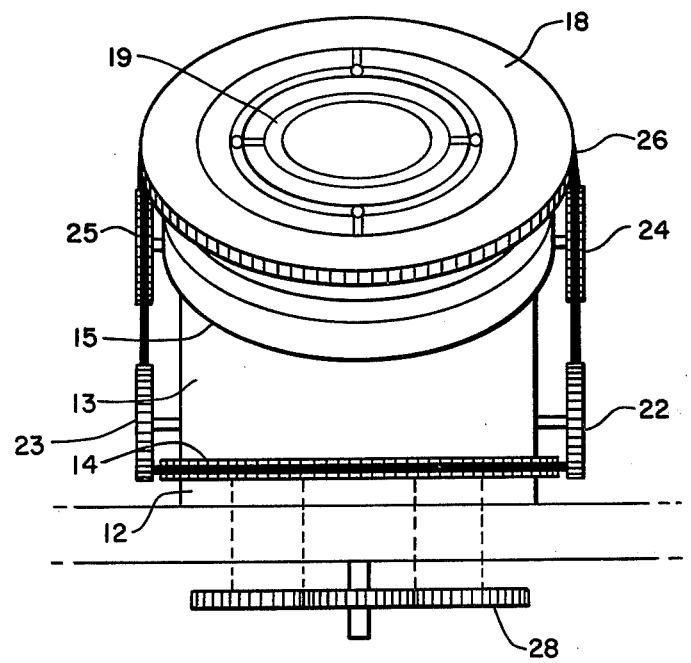
FIG. 2 is a side elevation view of the invention.

Referring to FIG. 2, rotary member 16 has a second planar surface 18 on which a conventional two axis gimbal assembly 19 or other device to be positioned is mounted. When rotary member 13 rotates relative to base 11, the axis of rotary member 16 describes a cone about the axis of rotary member 13. Rotation of rotary member 13 relative to base 11, therefore, permits two axis gimbal assembly 19 to have a maximum angular deviation from the axis of rotary member 13 equal to the sum of the cant angle and the angle allowed by the structure of two axis gimbal system 19. A total angle of about 85° has been attained.

Referring to FIG. 1, a gear 21 is fixed to central support member 12 and a gear 22 is rotatably connected to rotary member 13 near gear 21. A gear 24 is rotatably connected to rotary member 13 near the edge of planar surface 15. As shown in FIG. 2, a gear 23 and a gear 25 are rotatably connected to rotary member 13 opposite gears 22 and 24 respectively. A gear 26 is fixed to rotary member 16. Gears 21-26 are mounted so that they can be meshed with a belt 27 as shown in FIG. 1 and FIG. 2. Therefore, rotary member 16 will rotate opposite in direction to rotary member 13 whenever rotary member 13 rotates relative to base 11. Gears 21-26 are chosen so that rotary member 16 rotates at the same rate as rotary member 13. The gearing system causes planar surface 18 to have zero net angular displacement relative to base 11 during any integral number of revolutions of rotary member 13 while the axis of rotary member 16 describes a cone about the axis of rotary member 13.

Since surface 18 on which two axis gimbal system 19 is mounted has no net rotation relative to base 11, it is possible to make direct electrical and mechanical connections from base 11 to gimbals without the use of slip rings. All that is required is that the connecting means be flexible.

FIG. 1 shows how rotary member 13 may be caused to rotate relative to base 11. Rotary member 13 extends through base 11 and has a gear 28 fixed to rotary member 13. Gear 28 is meshed with a gear 29 which is rotatably mounted on base 11. The motion of gear 28 may be controlled by a motor, not shown, and appropriate position sensing devices. Thus, gear 28 together with its drive comprises a means for rotating rotary member 13 relative to mounting base 11.

Connections and mountings are made using an appropriate means for reducing friction whenever necessary. Components are made and assembled using methods known to those skilled in the mechanical arts.

What is claimed is:

1. A gimbal system comprising:
    a mounting base;
    a central support member extending from said mounting base;
    a first rotary member having a first planar surface and a second planar surface, said first planar surface being parallel to said mounting base and rotatably connected to said central support member, said second planar surface being at an angle to said first planar surface;
    means for rotating said first rotary member relative to said mounting base connected therebetween, such that the maximum angular deviation of said two axis gimbal assembly from a line perpendicular to said mounting base is the sum of the angle between said first and second planar surfaces of said first rotary member and the angle allowed by the structure of said two axis gimbal assembly; and a two axis gimbal assembly effectively connected to said second planar surface of said first rotary member.

2. A gimbal system according to claim 1 further comprising:

a second rotary member having two parallel planar surfaces which the first said planar surface rotatably of said second rotary member mounted on said second planar surface of said first rotary member and said second planar surface of said second rotary member for mounting said two axis gimbal assembly thereon; and means for counter-rotating said second rotary member relative to said first rotary member whenever said first rotary member rotates relative to said mounting base thereby causing said second rotary member to always have zero net angular displacement relative to said mounting base while the axis of said second rotary member describes a cone about said line perpendicular to said mounting base.

3. A gimbal system according to claim 1 wherein said mounting base is the airframe of an aircraft or missile.

4. A gimbal system according to claim 2 wherein said counter-rotating means comprises:

a first gear rigidly attached to said central support member;

a second gear rotatably connected to said first rotary member near said first planar surface thereof;

a third gear connected in the same manner as said second gear to said first rotary member and on the opposite side thereof;

a fourth gear rotatably connected to said first rotary member near said second planar surface thereof;

a fifth gear connected in the same manner as said fourth gear to said first rotary member and on the opposite side thereof;

a sixth gear rigidly attached to said second rotary member; and a toothed belt meshed with all said gears such that said second rotary member will counter-rotate relative to said first rotary member whenever said first rotary member rotates relative to said mounting base.

5. A gimbal system according to claim 1 wherein said counter-rotating means comprises:

a first gear rigidly attached to said central support member;

a second gear rotatably connected to said first rotary member and meshed with said first gear;

a third gear rotatably connected to said first rotary member and meshed with said second gear so that said second gear and said third gear will rotate in opposite directions; and a fourth gear rigidly attached to said second rotary member and meshed with said third gear; such that said second rotary member will counter-rotate relative to said first rotary member whenever said first rotary member rotates relative to said mounting base.

6. A supporting and positioning device comprising:

a mounting base;

a central support member extending from said mounting base;

a first rotary member having a first planar surface and a second planar surface;

said first planar surface being parallel to said mounting base and rotatably connected to said central support member;

said second planar surface being at an angle to said first planar surface;

a means for rotating said first rotary member relative to said mounting base;

a second rotary member having two parallel planar surfaces with the first said planar surface rotatably mounted on said second planar surface of said first rotary member;

a means for mounting a device to be positioned on said second planar surface of said second rotary member;

a means for rotating said first rotary member relative to said mounting base;

a means for counter-rotating said second rotary member relative to said first rotary member whenever said first rotary member rotates relative to said mounting base, thereby causing said second rotary member to have zero net angular displacement relative to said mounting base while the axis of said second rotary member describes a cone about a line perpendicular to said mounting base.

* * * * *